Nov. 13, 1923.
L. T. RHOADES
1,473,873
AUTOMOBILE STEERING WHEEL LOCK
Filed Sept. 27, 1921   3 Sheets-Sheet 1
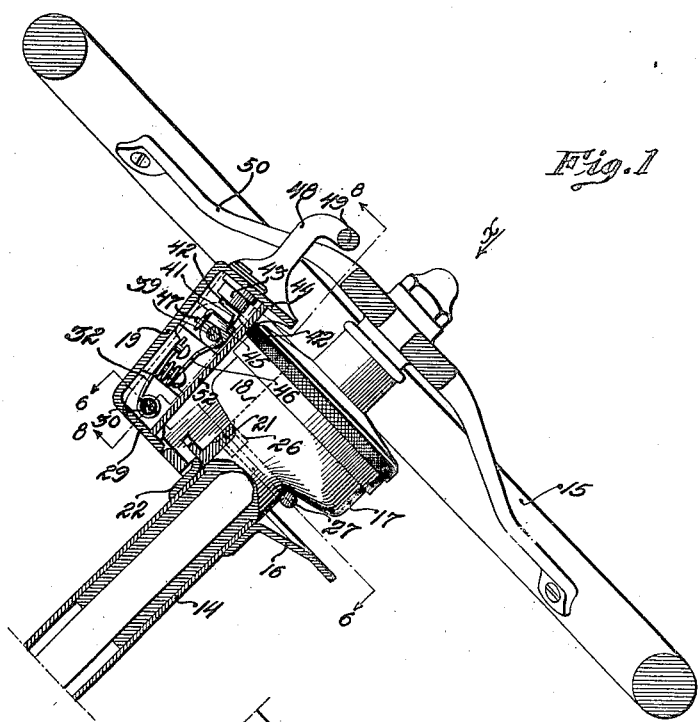
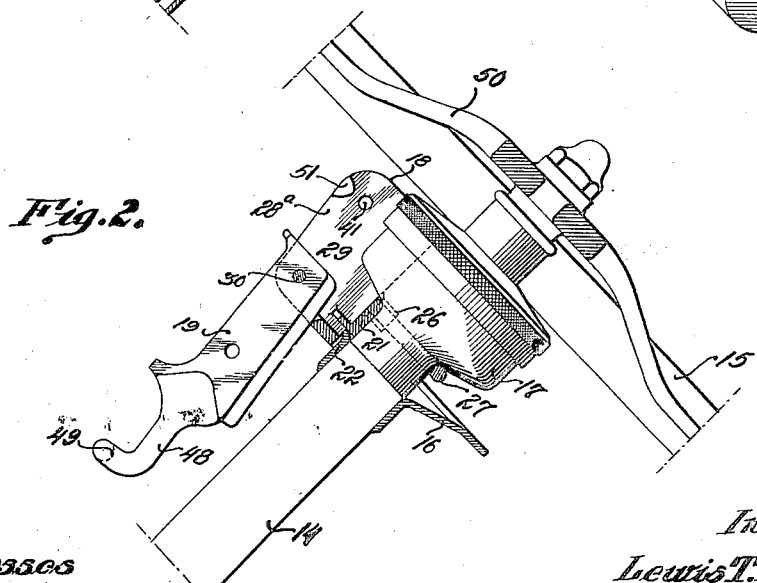

Nov. 13, 1923.   1,473,873
L. T. RHOADES
AUTOMOBILE STEERING WHEEL LOCK
Filed Sept. 27, 1921   3 Sheets-Sheet 2
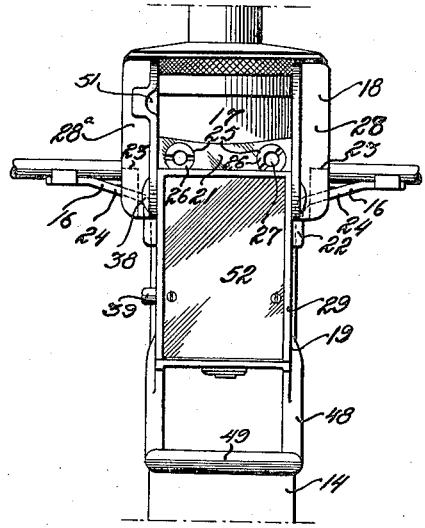
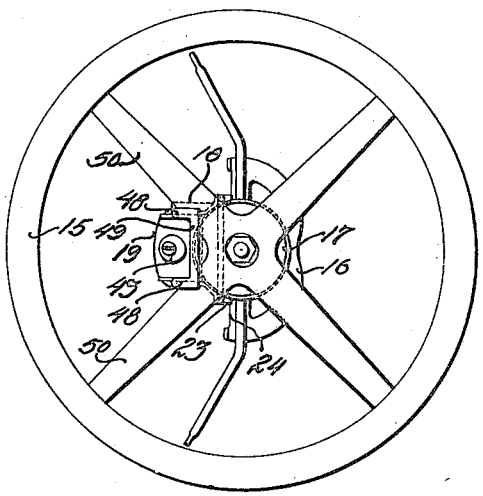
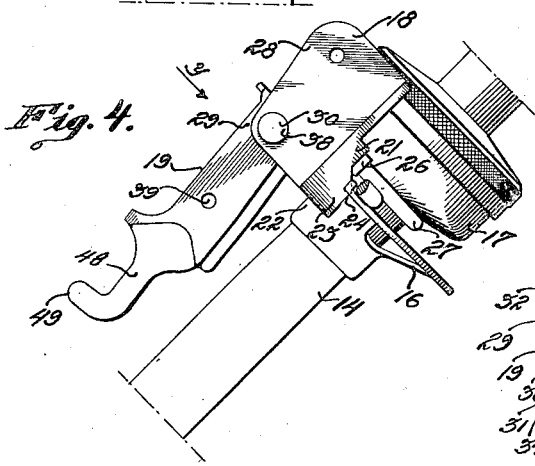
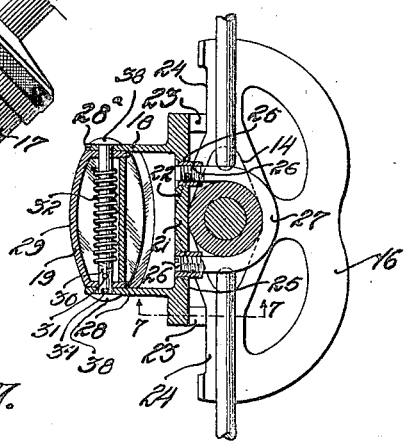
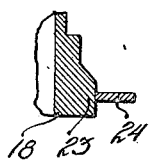

Nov. 13, 1923.
L. T. RHOADES
1,473,873
AUTOMOBILE STEERING WHEEL LOCK
Filed Sept. 27, 1921
3 Sheets-Sheet 3
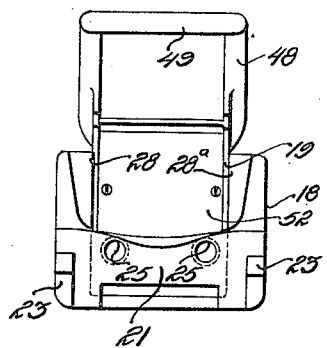
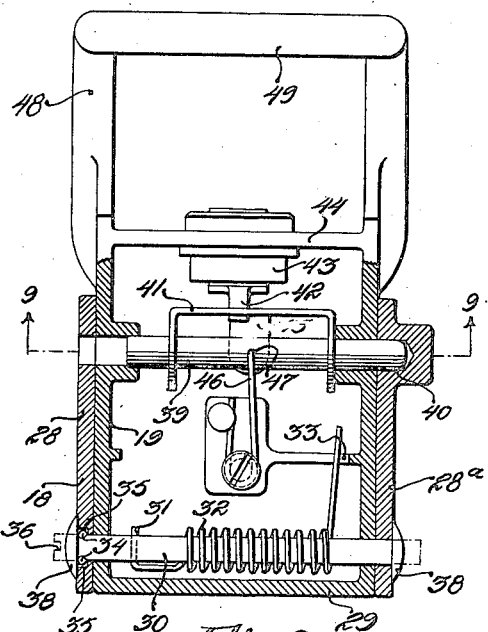
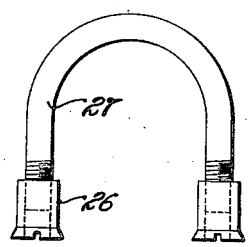
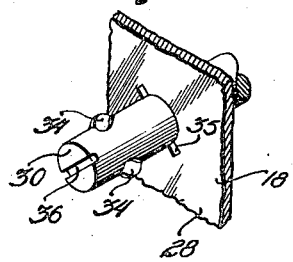
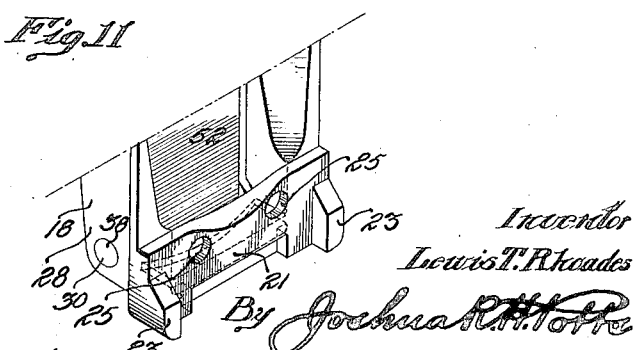

Patented Nov. 13, 1923.

1,473,873

UNITED STATES PATENT OFFICE.

LEWIS T. RHOADES, OF MONT CLARE, PENNSYLVANIA, ASSIGNOR TO NEW YORK COIL COMPANY, OF NEW YORK, N. Y.

AUTOMOBILE STEERING-WHEEL LOCK.

Application filed September 27, 1921. Serial No. 503,551.

*To all whom it may concern:*

Be it known that I, LEWIS T. RHOADES, a citizen of the United States, residing at Mont Clare, in the county of Montgomery and State of Pennsylvania, have invented certain new and useful Improvements in Automobile Steering-Wheel Locks, of which the following is a specification.

One object of my invention is to provide an improved steering wheel lock, for use on automobiles, which will be so constructed that it will securely lock the steering wheel against rotation and will also prevent the removal of the steering wheel from the steering wheel column.

Another object is to so construct and arrange the parts of my improved lock that it can be readily clamped against the spark and throttle control quadrant so that the latter prevents the lock from turning to the right or left or from moving downward.

A further object is to make my improved lock of a simple and durable construction and so that it can be readily manufactured and installed.

These objects, and other advantageous ends which will be described hereinafter, I attain in the following manner, reference being had to the accompanying drawings in which Figure 1 is a fragmentary elevation partly in section illustrating my improved lock in a position locking the steering wheel, Figure 2 is a view illustrating the lock in an open position so as to permit use of the steering wheel; certain of the parts being illustrated in section, Figure 3 is a view looking in the direction of the arrow *x* in Figure 1 and drawn on a smaller scale; the parts all being illustrated in outside view, Figure 4 is a fragmentary elevation showing the parts in the position illustrated in Figure 2 and also illustrating the spark and throttle control quadrant in outside view, Figure 5 is a view looking in the direction of the arrow *y* in Figure 4, Figure 6 is a section taken on the line 6—6 of Figure 1, Figure 7 is a section taken on the line 7—7 of Figure 6, Figure 8 is an enlarged section taken on the line 8—8 of Figure 1, Figure 9 is a section taken on the line 9—9 of Figure 8, Figure 10 is a rear elevation of the lock housings showing the same in the position which they assume when locked and removed from the steering wheel column, Figure 11 is a fragmentary perspective view of a portion of the lock housing.

Figure 12 is a view showing the U-shape securing rod and its connecting sleeve nuts, and Figure 13 is a fragmentary perspective view illustrating how certain of the parts are put together.

Referring to the drawings, 14 represents a steering wheel column and 15 represents the steering wheel which is secured to said column; said wheel and column being of the type used on the well known "Ford" automobile. The column has a spark and throttle control quadrant 16 rigidly secured thereto below the enlarged portion 17 of the column which serves as a gear case for the usual steering reduction gears.

My improved lock includes two housing sections 18 and 19. The housing section 18 has a transversely extending back plate portion 21 adapted to fit between the upper edge of the sleeve 22 of the quadrant 16 and the lower portion of the enlargement 17 of the steering column 14. In addition to this the rear of the housing section 18 has two lugs 23 which are spaced apart and adapted to abut the front edge 24 of the quadrant 16 as clearly shown in Figures 6 and 7. The rear plate 21 of the housing section 18 has two holes 25 extending therethrough; said holes flaring inwardly so as to form a seat for the outer flared ends of internally screw threaded sleeve nuts or nipples 26. A yoked or U-shape rod 27 has its opposite ends screw threaded and adapted to engage the internal screw threads of the nuts 26. This U-shape rod 27 is adapted to embrace the steering wheel column 14 at a position between the quadrant 16 and the enlargement 17 as clearly shown in Figures 1, 2 and 6. The inner ends of the nuts 26 are preferably provided with screw driver slots or kerfs so that by inserting a screw driver within the housing section 18 the nuts can be turned so as to clamp the rod 27 around the column between the quadrant 16 and the enlargement 17 and also to clamp the lugs 23 against the edge 24 of the quadrant 16 at opposite sides of the steering column. Thus the housing section 18 is securely fixed in position so that it cannot be rotated nor can it be moved lengthwise of the steering column. This is an important feature of my invention as will be further noted in the following description.

The housing section 18 has two forwardly projecting side flanges 28 and 28ª between which the lower box portion 29 of the housing section 19 is adapted to be swung on the hinge pin 30. This hinge pin 30 extends through the housing sections 18 and 19 as clearly shown in Figure 8 and has one end 31 of a torsion spring 32 secured thereto; the other end of the torsion spring being adapted to bear upon a rib 33 in the housing 19. The hinge pin 30 has its opposite ends upset or riveted and is prevented from rotating within the housing section 18 by struck-up projections 34 which fit within notches 35 in the housing section 18. To insert this hinge pin, the pin at its ends is initially of the shape illustrated in dot-and-dash lines in Figure 8 to permit the pin to be inserted through the sections and the pin can be rotated in order to place the spring 32 under tension and to facilitate this movement of the pin one end is provided with a screw driver slot or kerf 36 and the pin is rotated before the struck-up portions 34 enter the notches 35. After the pin has been rotated sufficiently to apply the desired tension to the spring 32 the pin is moved lengthwise to permit the portions 34 to enter the notches 35, after which the opposite ends of the pin are upset so as to provide the integral inner heads as shown at 38 in Figure 8. The spring 32 normally tends to move the upper portion of the housing section 19 downwardly from between the flanges 28 and 28ª into the position shown in Figures 2 and 4 and to hold the same in said position to prevent accidental swinging of the housing section 19 when the device is unlocked as will be more fully explained hereinafter.

The box portion 29 of the housing section 19 includes a transversely slidable bolt 39 which, when the section 19 is raised into the position shown in Figures 1 and 8, can be moved so that one end will project into a cavity 40 in the flange 28ª of the housing section 18. A yoked member 41 is supported on the bolt 39 and has a slot in which extends an actuating portion 42 on a key-operated lock 43 which is secured in the top 44 of the housing section 19. The member 41 has an extension 45. A spring 46 has a portion 47 which extends through the bolt and into the portion 45 of the member 41. Thus when the lock is operated by a key from the outside of the box portion of the section 19 the part 42 will move the member 41 and the bolt will be moved through the medium of the portion 42 and spring 46 so as to withdraw the end of the bolt from the cavity 40 and permit the spring 32 to swing the section 19 downward.

The housing section 19 has a comparatively wide looped arm 48 which projects beyond the top 44 and said looped arm includes a transversely extending portion 49 in the form of a hook. This hooked arm 48, when the housing sections are locked together by the bolt 39, extends upwardly through the space between two adjacent spokes 50 of the steering wheel 15 in a manner that the hooked portion 49 extends over the tops of said spokes as clearly shown in Figures 1 and 3. Thus it will be impossible to turn the steering wheel or to move it in the direction of its axis. It will be further noted that it is impossible to turn the fixed section 18 either to the right or to the left for the reason that the lugs 23 are in engagement with the fixed quadrant 16 and furthermore the fixed section 18 has a portion locked between the quadrant and the enlargement 17 of the steering column as hereinafter described.

To remove the arm 48 from locking engagement relatively to the spokes of the steering wheel, it is merely necessary to insert the key within the lock 43 and by turning the key the portion 42 of the lock will act through the medium of the yoke 41 and the end 47 of the spring 46 to withdraw the bolt 39 from the cavity 40 and the spring 32 will then swing the housing section 19 downward and the key can be removed. When it is desired to again lock the steering wheel it is merely necessary to swing the housing section 19 upward and the bolt will first be moved against the action of the spring 46 due to engagement with the beveled portion 51 and when the bolt registers with the cavity 40 the spring 46 will effect the movement of said bolt into the cavity to lock the housing sections together.

I preferably cover the rear part of the box portion 29 of the housing section 19 with a plate 52 which may be screwed in place and when the housing sections are locked together it will be impossible to secure access to the interior of the box portion 29.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with a steering wheel column having a spark and throttle quadrant rigidly secured thereto, of a lock including a portion having parts adapted to engage the quadrant to prevent rotation of said portion relatively to the column; locking means embracing said column and adapted to prevent movement of said first portion in the direction of the length of said column; and locking means movably connected to said first portion and having a part adapted to be held in a position between and over spokes of the wheel; substantially as described.

2. The combination with a steering wheel column having a spark and throttle quadrant rigidly secured thereto and an enlarged part spaced above said quadrant, of a lock including a portion having parts adapted to engage the quadrant to prevent rotation of said portion relatively to the column; locking means embracing said column between said quadrant and enlarged part and secured to said first portion so as to prevent movement of said first portion in the direction of the length of the column; and locking means movably connected to said first portion and having a part adapted to engage said wheel; substantially as described.

3. The combination with a steering wheel column having a spark and throttle quadrant rigidly secured thereto and an enlarged part spaced above said quadrant, of a lock including a portion having parts adapted to engage the quadrant to prevent rotation of said portion relatively to the column; locking means embracing said column between said quadrant and enlarged part and secured to said first portion so as to prevent movement of said first portion in the direction of the length of the column; and locking means movably connected to said first portion and having a part adapted to be held in a position between and over two spokes of said wheel; substantially as described.

4. The combination with a steering wheel column having a spark and throttle quadrant rigidly secured thereto and an enlarged part spaced above said quadrant, of a lock including a portion having parts adapted to engage the quadrant to prevent rotation of said portion relatively to the column; locking means embracing said column between said quadrant and enlarged part and secured to said first portion so as to prevent movement of said first portion in the direction of the length of the column; and locking means movably connected to said first portion and having a part adapted to engage said wheel, said first portion having a transversely extending part positioned between said quadrant and enlarged part of the column; substantially as described.

5. A steering wheel lock of the character described comprising a stationary and movable housing; a locking bolt provided with means to automatically lock both housings together without the use of a key, said movable housing having a part adapted to lock the steering wheel against rotation or removal; and a key-operative lock adapted to move said bolt into an unlocked position; substantially as described.

6. The combination with a steering wheel column having a spark and throttle quadrant rigidly secured thereto and an enlarged portion spaced from said quadrant, of a lock including a portion having lugs spaced apart and adapted to engage said quadrant to prevent rotation of said portion relatively to said column; a U-shape member for embracing the column between said quadrant and enlarged portion; and locking means connected to said first portion of the lock and adapted to engage over said wheel and between spokes thereof; substantially as described.

7. A steering wheel locking device including a stationary housing having means for mounting it rigidly on the steering wheel column in engagement with the spark and throttle quadrant; a movable housing; a lock therein; a locking bolt; a spring for the locking bolt adapted to move the bolt in one direction to secure the movable housing to the stationary housing, said lock being operative to move the bolt out of engagement with the stationary housing, said movable housing when in its locked position having a portion for engaging with and over the steering wheel; and a spring for moving and holding the movable housing out of engagement with the wheel when unlocked, and to hold said movable housing against accidental movement; substantially as described.

8. A steering wheel lock including a housing provided with means for mounting it on the steering wheel column and rearwardly extending means for preventing rotation thereon, and having forwardly projecting flanges; a second housing having a box portion pivotally connected to said first housing and movable so that the box portion will move into and out of the space between said flanges; a bolt carried within said box portion and adapted to be moved into locking engagement with said first housing; and locking means for effecting the movement of said bolt from locking engagement with said first housing, said second housing having a projecting portion for locking engagement with the steering wheel; substantially as described.

In testimony whereof I have signed my name to this specification in the presence of two subscribing witnesses.

LEWIS T. RHOADES.

Witnesses:
R. F. DENNIS,
M. FITZGERALD.